UNITED STATES PATENT OFFICE.

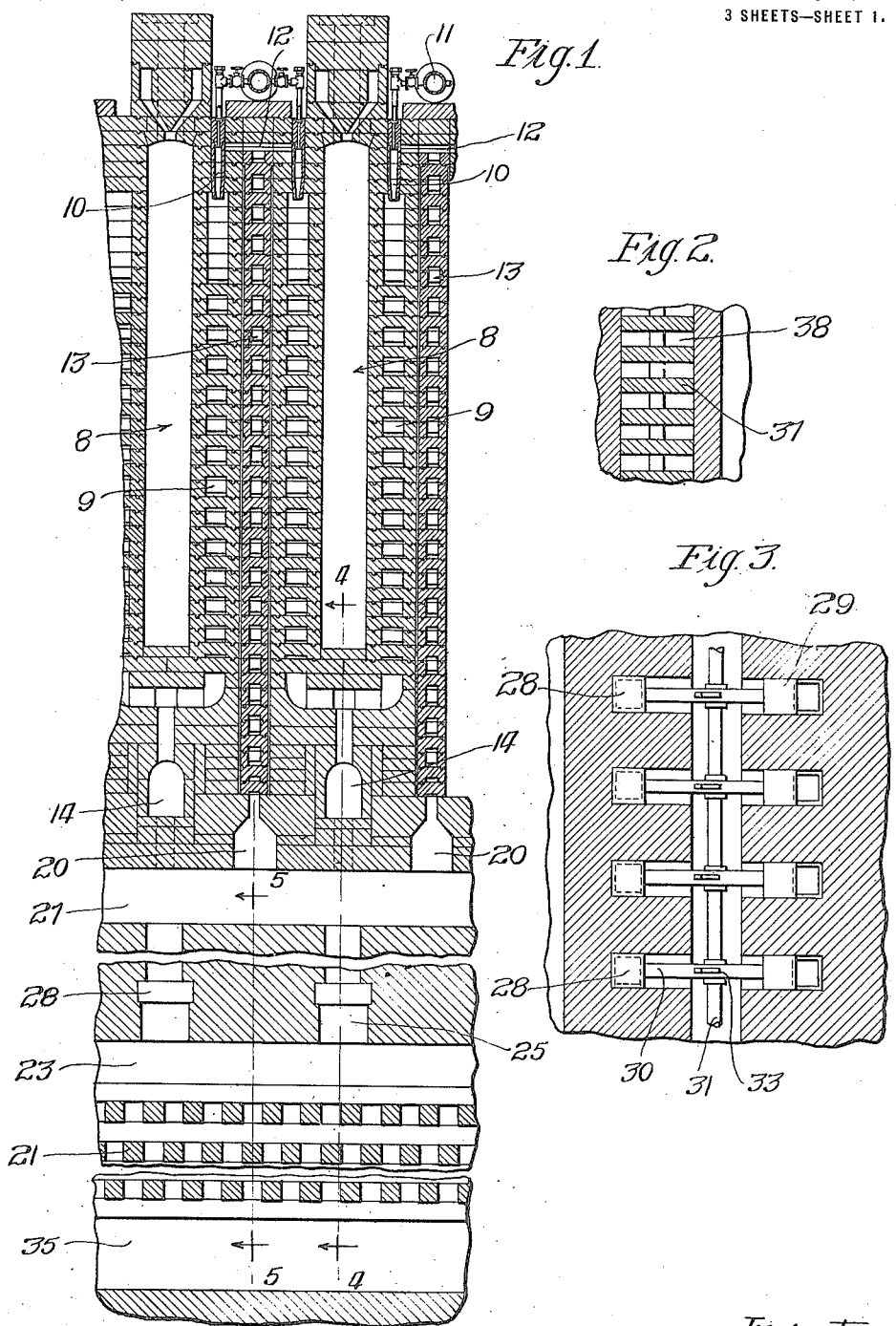

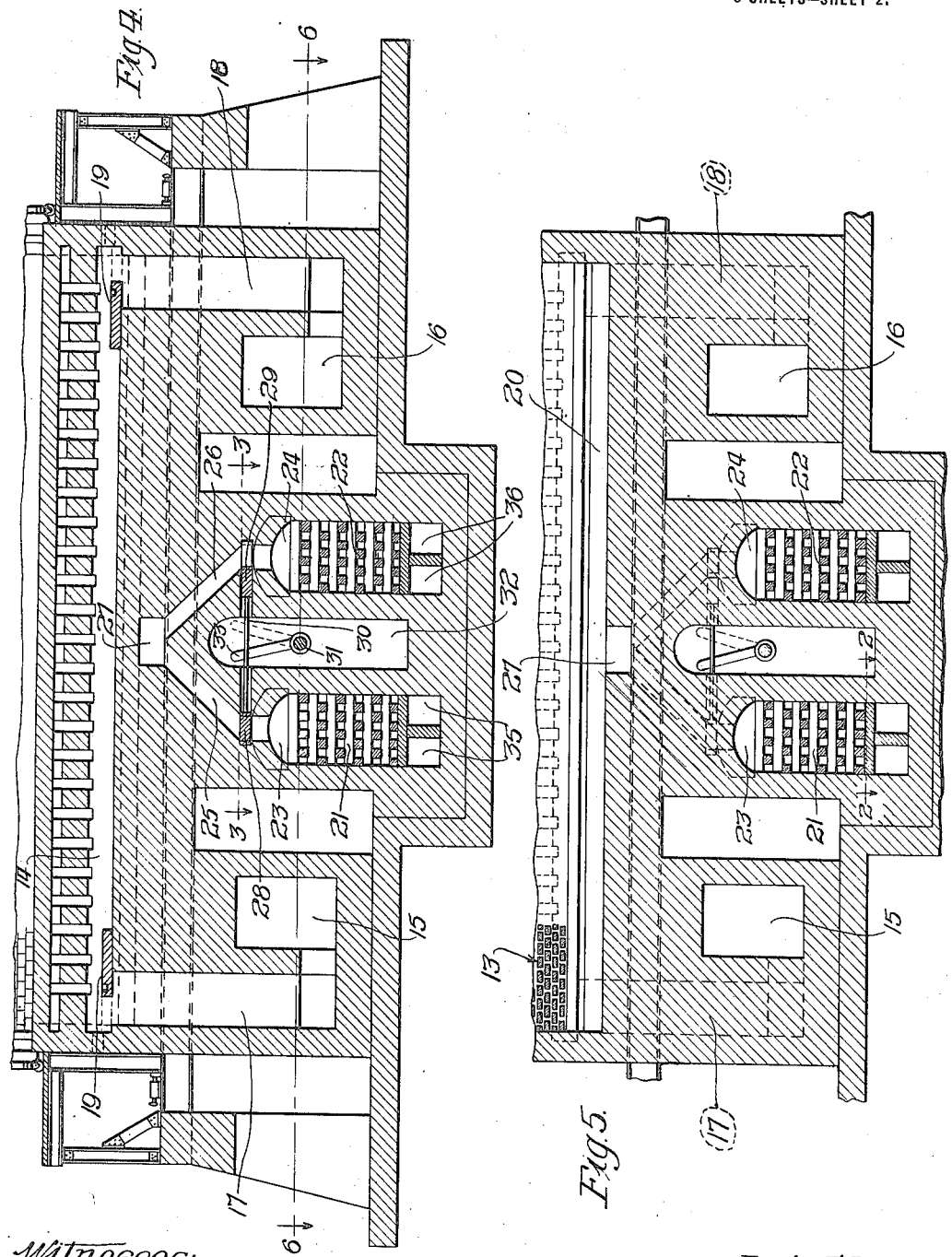

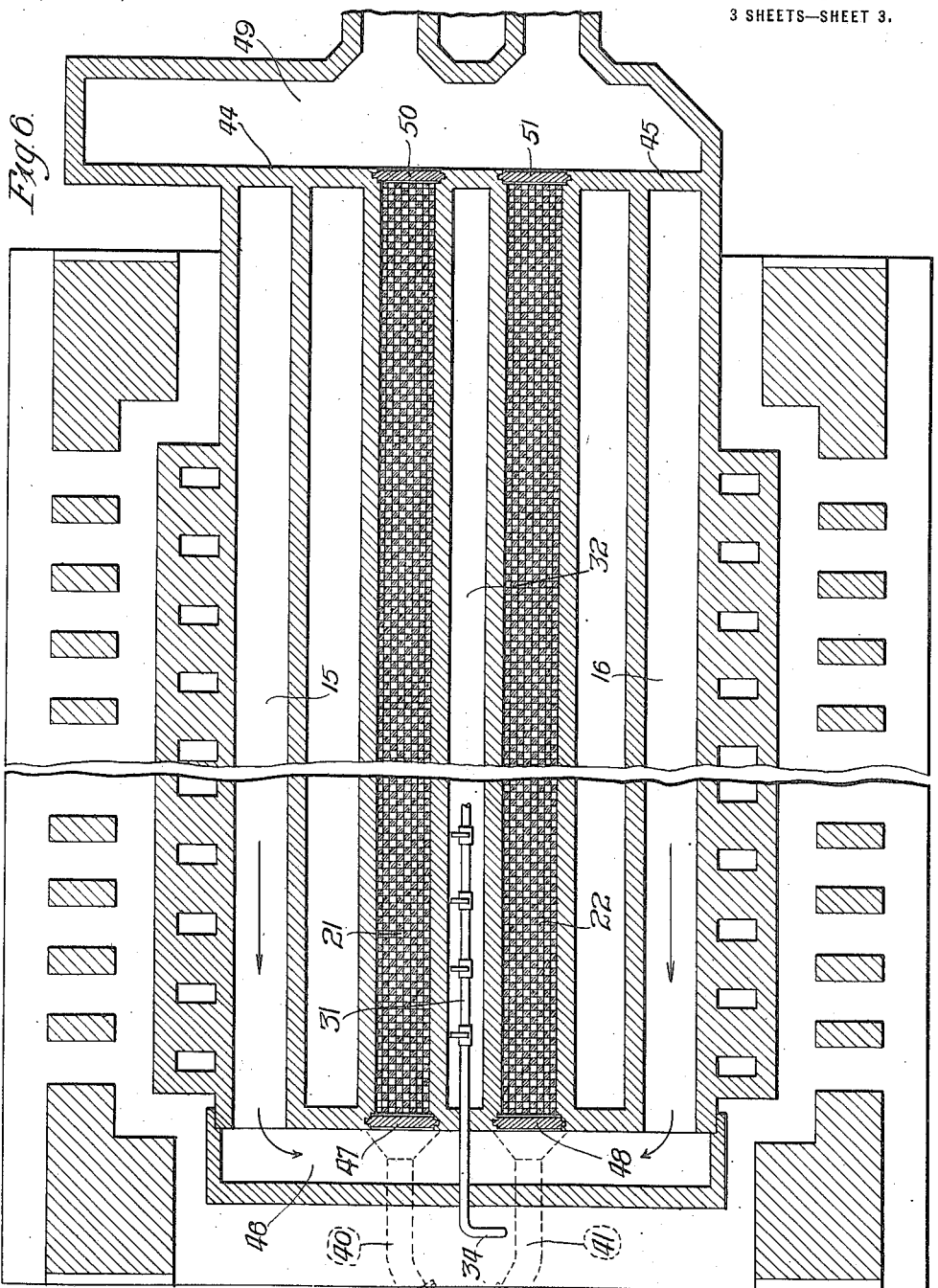

ARTHUR ROBERTS, OF EVANSTON, ILLINOIS.

REGENERATIVE COKE-OVEN.

1,193,067.      Specification of Letters Patent.      Patented Aug. 1, 1916.

Application filed February 23, 1915, Serial No. 10,041. Renewed May 8, 1916. Serial No. 96,251.

*To all whom it may concern:*

Be it known that I, ARTHUR ROBERTS, a citizen of the United States, residing at Evanston, county of Cook, and State of Illinois, have invented certain new and useful Improvements in Regenerative Coke-Ovens, of which the following is a specification.

The present invention has reference to certain improvements in regenerative coke ovens, that is coke ovens of the type in which a portion or substantially all of the waste heat carried over in the spent heating gases may be regenerated and returned to the ovens by preheating the incoming air supply.

Various forms of oven and related structures have been devised for the recovery of heat by regeneration but these have been subject to certain objections. Ordinarily the regeneration is accomplished by the provision of a checker-work of heat absorbing material in the walls of the oven, the structure being so arranged that during one portion of the heating cycle the checker-work adjacent to one-half of the oven walls is being heated while that adjacent to the other half of the oven walls is being cooled by giving up its heat to the incoming air. This arrangement presents the serious objection that the oven walls themselves are constantly subjected to variations of temperature, each half of the oven walls being alternately heated and cooled. This alternate heating and cooling subjects the walls to very severe stresses of expansion and contraction and as a consequence the walls soon become cracked and leaky allowing the gases of distillation to waste away. Further than this the variations of temperature of the oven walls result in an uneven and imperfect coking of the charge so that the coke produced and the distillates given off are not of a uniform high quality.

According to the present invention I place the regenerative structure at a point away from the walls of the oven, the heating walls being of any suitable or desirable form, as for example of the form shown in Letters Patent of the United States, No. 1,132,685, issued to me March 23, 1915. In other words, as far as the structure of the heating walls is concerned the same need not necessarily be modified in order to combine with it the regenerative feature to which the present invention relates. The regenerator structure is conveniently placed in the foundation or lower portion of the oven bench, extending along centrally beneath the same. By this arrangement it is so located as to secure substantially uniform distribution of the heated air to all portions of the heating walls of each oven.

Various objects and uses of the invention will appear from a detailed description of the same which consists in the features of construction and combinations of parts hereinafter described and claimed.

Referring to the drawings: Figure 1 shows a cross section through two adjacent ovens of a bench, and through the foundation beneath the ovens, certain portions of the foundation being cut away to permit the same to be shown of reduced height; Fig. 2 is a fragmentary horizontal section taken on the line 2—2 of Fig. 5 looking in the direction of the arrows; Fig. 3 is a horizontal fragmentary section taken on the line 3—3 of Fig. 4 looking in the direction of the arrows; Fig. 4 is a vertical cross section taken on the line 4—4 of Fig. 1 looking in the direction of the arrows; Fig. 5 is a vertical cross section taken on the line 5—5 of Fig. 1 looking in the direction of the arrows; and Fig. 6 is a horizontal section through the foundation beneath a bench of ovens being taken on the line 6—6 of Fig. 4 looking in the direction of the arrows.

Referring to the several drawings, oven carbonizing chambers are designated by the numeral 8. I have shown each oven as being provided with heating walls 9 of the form disclosed in the Letters Patent No. 1,132,685. However, the exact type or construction of heating wall adopted for the ovens is not dependent upon or related to the regenerative features to which the present invention relates. In the upper portion of each heating wall there are provided a plurality of gas nozzles 10 which receive their fuel supply from the headers 11 lying above the heating walls. Each of the nozzles is provided with a side opening communicating with a passage 12 which in turn receives an air supply from the space between two consecutive ovens. In the particular arrangement illustrated I have shown a recuperating wall 13 between each pair of ovens, the fresh air supply for two adjacent heating walls passing up through this recuperating wall to a row of passages 12, and thence to the nozzles or burners for the heating walls in question. This recuperating wall construction embodies certain features disclosed in my co-pending application, Serial No. 875,503, filed December 4, 1914. However, as far as the regenerative features to which the present invention particularly relates, the recuperating walls 13 might be eliminated and any suitable form of air passage or opening might be provided for conveying the fresh air from the regenerators to the passages 12. In accordance with the disclosures of the aforesaid Letters Patent No. 1,132,685, the spent gases from the heating walls of each oven pass downward and find their way into a transverse passage 14 beneath the sole of the oven. Beneath the sides of the bench of ovens are the longitudinal tunnels 15 and 16, and the end portions of each passage 14 communicate with the tunnels 15 and 16 by means of the downcomers 17 and 18, respectively. Dampers 19 control the openings between the passages 14 and the downcomers so that the drafts in the several ovens of the bench can be equalized. The fresh air for each set of openings 12 is supplied from a passage 20 extending across the bench beneath the recuperating wall, if a recuperating wall be used, or beneath the adjacent heating walls. In the arrangement illustrated each passage 20 supplies its air to the entire length of the lower end of the recuperating wall.

Beneath the central portion of the bench of ovens, and running lengthwise of the bench, are the regenerative chambers 21 and 22. These chambers preferably extend the full length of the bench of ovens, but they should at any rate be of sufficient size to give a sufficient total regenerating capacity in view of the size and capacity of the ovens contained in the bench. By properly proportioning the parts the desired regenerative capacity can be secured in a length substantially equal to that of the bench of ovens so that for regenerative purposes the long regenerators may be considered as made up from a plurality of individual regenerators placed side by side or end to end.

Above the regenerators 21 and 22 are the air spaces 23 and 24, respectively. Leading upward from these air spaces are the leads 25 and 26 which draw together and communicate with a common flue 27 extending lengthwise of the bench of ovens. The middle portion of each passage 20 communicates with the flue 27 so that the air finds its way from the desired regenerator to the passages 20 by way of the flue 27. The dampers 28 and 29 serve to control the delivery of air from the one regenerator or the other by controlling the communication of the space 23 or the space 24 with the flue 27. The dampers are shown as working in pairs, each pair being connected by a cross rod 30. A rock shaft 31 extends the length of the bench inside of the space 32 between the regenerators, said rock shaft 31 having the upstanding arms 33 by means of which all of the dampers for the entire bench can be simultaneously thrown. The rod 31 may be manipulated in any desired manner, it being shown as provided with a crank 34 protruding at one end of the bench.

The passageways 35 and 36 are provided beneath the regenerators 21 and 22, respectively, and there are regularly spaced connections from the passages 35 and 36 to the heat absorbing material of their respective regenerators. In the arrangement illustrated, the checker-work for each regenerator is supported by means of a grid or the like 37, as best shown in Fig. 2, the air passing up through the openings 38 of the grid.

Referring to Fig. 6 the air supply pipe is shown at 39. It branches and communicates by means of the leads 40 and 41 with the passages 35 and 36, respectively. The valves 42 and 43 control the supply of air through the one or the other of the leads. The back ends of the passages 35 and 36 are closed so that whatever air is supplied to either the one or the other of said passages must pass up through the corresponding regenerator.

The tunnels 15 and 16 have their back ends closed, as shown at 44 and 45, so that the spent gases entering said tunnels are forced to travel toward the front of the bench. At the front end said tunnels are connected together by a cross connection 46, which, however, is separated from the air connections 40 and 41. The cross connection 46 may deliver spent gases to the front end of either regenerator depending upon which of the dampers 47 and 48 is open and which is closed. The cross connection 49 at the back end of the bench communicates with the stacks or boilers or with the draft producing fans depending upon what ultimate disposition is to be made of the spent gases. The back end of the one or the other regenerator will communicate with the cross connection 49 depending upon which of the dampers 50 and 51 is open and which is closed. All of the dampers 47, 48, 50 and 51 may be of any suitable construction. For purposes of convenience, I have illustrated them in Fig. 6 as rectangular in form provided with central rods for their manipulation. However, this form is shown only as a matter of convenience.

The operation of the regenerative feature of the entire bench will now be readily appreciated. Assuming that the regenerator 21 is alive or freshly heated and the regenerator 22 dead or cooled the operation would be as follows: The dampers 47 and 50 being closed and the dampers 48 and 51 being open the spent gases coming down from the ovens would be caused to travel from the front to the back of the bench, traversing the length of the regenerator 22. The valve 42 being open and the valve 43 closed, and the rock shaft 31 being thrown to the right so as to carry the levers 33 into the dotted line position shown in Figs. 4 and 5, the incoming air will rise through the regenerator 21, absorbing heat from the same and passing up to the various ovens above. By reason of the closing of the valve 43 and the dampers 29 the regenerator 22 will be isolated from the air supply at such times, and will therefore be subjected simply to the heating action of the outflowing spent gases.

It will be seen from the foregoing description that in order to reverse the regenerative action with this arrangement it is only necessary to throw the rock shaft, reverse the valves 42 and 43, reverse the dampers 47 and 48, and reverse the dampers 50 and 51. All of these operations can be very readily controlled by any of the well known controlling devices, the construction of which need not be herein disclosed.

It was previously stated that while I have shown a recuperative wall 13 between the heating walls of consecutive ovens, said recuperative wall serving to convey the incoming air to the burners, that nevertheless the recuperative wall might be dispensed with and any other suitable passage substituted for controlling the air to the burners. While this is true, still I desire to point out the fact that in many cases the recuperative wall bears a peculiar relationship to the regenerator. It will be observed that immediately after each reversal of the regenerator the incoming air is heated to the maximum extent, and that thereafter the amount of regenerative preheating will regularly diminish until the next reversal. As a consequence the temperature of combustion will likewise undergo a certain amount of fluctuation. In many cases this fluctuation will not be undesirably large. However, by carrying the air through the recuperative walls after it has been preheated by the regenerator, the total amount of preheating will be maintained substantially constant so that a very much more uniform and regular preheating will be secured.

While I have herein shown and described only a single embodiment of my invention still it will be apparent that many changes of construction may be effected without departing from the spirit of the invention. Therefore I do not limit myself to the construction illustrated and described herein except as I may do so in the claims.

I claim:

1. The combination with a bench of ovens, an air supply inlet, and a spent gas outlet, of a pair of regenerators extending lengthwise beneath the bench of ovens, tunnels running lengthwise beneath the sides of the bench, downcomers from the heating walls of each oven to said tunnels, an air supply passage running lengthwise beneath the central portion of the bench of ovens, connections from said passage to the burners of each heating wall, a connection from the upper portion of each regenerator to the air supply passage, a valve in each of said connections, means for simultaneously closing the valves from one regenerator to the air supply passage and opening the valve from the other regenerator to the said passage, a connection from the tunnels to one end of each regenerator, a damper between each regenerator and the said connection, a connection from the other end of each regenerator to the spent gas outlet, a passageway beneath each regenerator, a connection from the air supply inlet to each of said passageways, and a valve in each of said connections.

2. The combination with a bench of ovens, an air supply inlet, and a spent gas outlet, of a pair of regenerators extending lengthwise beneath the central portion of the bench of ovens, tunnels running lengthwise beneath the sides of the bench, downcomers from the heating walls of each oven to said tunnels, an air supply passage running lengthwise beneath the central portion of the bench of ovens and above the regenerators, connections from said passage to the burners of each heating wall, a connection from the upper portion of each regenerator to the air supply passage, a valve in each of said connections, means for simultaneously closing the valves from one regenerator to the air supply passage and opening the valves from the other regenerator to the said passage, a connection from the tunnels to one end of each regenerator, a damper between each regenerator and the said connection, a connection from the other end of each regenerator to the spent gas outlet, a passageway beneath each regenerator, a connection from the air supply inlet to each of said passageways, and a valve in each of said connections.

3. The combination with a bench of ovens, an air supply inlet, and a spent gas outlet, of a pair of regenerators extending lengthwise beneath the bench of ovens, tunnels extending lengthwise beneath the sides of the bench, downcomers from the heating walls of each oven to said tunnels, an air supply passage running lengthwise of the bench between the ovens and the regenerators, connections from said passage to the burners of each heating wall, a connection from the upper portion of each regenerator to the air supply passage, a valve in each of said last mentioned connections, means for simultaneously closing the valve from one regenerator to the air supply passage and opening the valve from the other regenerator to said passage, a connection from the tunnels to one end of each regenerator, a damper between each regenerator and the said connection, a connection from the other end of each regenerator to the spent gas outlet, a passageway beneath each regenerator, connections from the air supply inlet to each of said passageways, and a valve in each of said connections.

4. The combination with a bench of ovens, an air supply inlet, and a spent gas outlet, of a pair of regenerators beneath the central portion of the bench of ovens, tunnels running lengthwise beneath the sides of the bench, downcomers from the heating walls of each oven to said tunnels, an air supply passage beneath the ovens, connections from said passage to the burners of each heating wall, connections from the upper portion of each regenerator to the air supply passage, a valve in each of said connections, a connection from the tunnels to one end of each regenerator, a damper between each regenerator and the said connection, a connection from the other end of each regenerator to the spent gas outlet, a passageway beneath each regenerator, a connection from the air supply inlet to each of said passageways, and a valve in each of said connections.

5. The combination with a bench of ovens, an air supply inlet, and a spent gas outlet, of a pair of regenerators beneath the bench of ovens, an air supply passage beneath the ovens and above the regenerators, connections from said passage to the burners of each heating wall, a connection from the upper portion of each regenerator to the air supply passage, a valve in each of said connections, connections from the heating walls of the ovens to one end of each regenerator, a damper in each of said connections, a connection from the other end of each regenerator to the spent gas outlet, a passageway beneath each regenerator, connections from the air supply inlet to each of said passageways, and a valve in each of said connections.

6. The combination with a bench of ovens, an air supply inlet, and a spent gas outlet, of tunnels running lengthwise beneath the sides of the bench, downcomers from the heating walls of each oven to said tunnels, an air supply passage beneath the ovens, connections from said passage to the burners of each heating wall, a pair of regenerators between the tunnels, a connection from the tunnels to one end of each regenerator, a damper in each of said connections, a connection from the top of each regenerator to the air supply passage, a valve in each of said connections, a connection from the other end of each regenerator to the spent gas outlet, a damper in each of said connections, a passageway beneath each regenerator, connections from the air supply inlet to said passageways, and a valve in each of said connections.

7. The combination with a bench of ovens, an air supply inlet, and a spent gas outlet, of a pair of regenerators beneath the ovens, connections from the heating walls of the ovens to one end of each of said regenerators for the delivery of spent gases thereto, a damper in each of said connections, a connection from the other end of each regenerator to the spent gas outlet, a damper in each of said connections, connections from the upper portion of each regenerator to the burners of the ovens, a valve in each of said connections, connections from the air supply inlet to the lower portion of each regenerator, and a valve in each of said connections.

8. The combination with a bench of ovens, an air supply inlet, and a spent gas outlet, of connections from the heating walls to one end of each regenerator for the delivery of spent gases thereto, a damper in each of said connections, a connection from the other end of each regenerator to the spent gas outlet, a damper in each of said connections, connections from the entire upper surface of each regenerator to the burners of the ovens, a valve in each of said connections, connections from the air supply inlet to the entire lower surface of each regenerator, and a valve in each of said connections.

9. The combination with a bench of ovens, an air supply inlet, and a spent gas outlet, of a pair of regenerators, connections from the heating walls of the ovens to one face of each regenerator, dampers in said connections, a connection from the opposite face of each regenerator to the spent gas outlet, a damper in each of said connections, connections from another face of each regenerator to the oven burners, a valve in each of said connections, connections from the air supply inlet to the opposite face of each regenerator, and a valve in each of said connections.

10. The combination with a bench of ovens, an air supply inlet, and a spent gas outlet, of a pair of regenerators, connections from the heating walls of each oven to one face of each regenerator, a damper in each of said connections, a connection from the opposite face of each regenerator to the spent gas outlet, a damper in each of said connections, a connection from the air supply inlet to the entire area of another surface of each regenerator, a valve in each of said connections, a connection from the entire area of the opposite face of each regenerator to the oven burners, and a valve in each of said connections.

11. The combination with a bench of ovens, an air supply inlet, and a spent gas outlet, of connections from the heating walls of the ovens to one face of each regenerator for the delivery of spent gases thereto, a damper in each of said connections, a connection from the opposite face of each regenerator to the spent gas outlet, a damper in each of said connections, whereby spent gases from the heating walls traverse the regenerators in a given direction of travel, a connection from the air supply inlet to another face of each regenerator, a valve in each of said connections, a connection from the opposite face of each regenerator to the oven burners, and a valve in each of said connections, wherebey the incoming air traverses the regenerators in a direction different from that traversed by the outgoing spent gas.

12. The combination with a bench of ovens, an air supply inlet, and a spent gas outlet, of connections leading to four contiguous faces of each regenerator, one of said connections leading to the heating walls of each oven, another of said connections leading to the spent gas outlet, another of said connections leading to the air supply inlet, and another of said connections leading to the oven burners, and valves or dampers in all of said connections.

13. The combination with a bench of ovens, an air supply inlet, and a spent gas outlet, of a pair of regenerators, a spent gas passageway 46, a damper between said passageway and one end of each regenerator, a spent gas passageway 49, dampers between the other end of each regenerator and said passageway, passages 35 and 36 beneath the regenerators, connections from the air supply inlet to said passages, valves in said connections, passages 23 and 24 above the regenerators, connections from said passages to the oven burners, and valves in said connections.

14. The combination with a bench of ovens, an air supply inlet, and a spent gas outlet, of a pair of regenerators beneath the ovens, connections from the heating walls of the ovens to the regenerators and from the regenerators to the spent gas outlet, said connections being suitably disposed to insure the travel of spent gases through the regenerators in a given direction, valves for controlling the flow of spent gas through the regenerators and through said connections in said direction, connections from the air supply inlet to the regenerators and from the regenerators to the burners of the ovens, said connections being suitably disposed to insure the travel of air through the regenerators in a direction across the direction of travel for the spent gases, and valves in said connections for controlling such travel of the air.

15. The combination with a bench of ovens, an air supply inlet, and a spent gas outlet, of connections between the regenerators and the oven burners, the heating walls of the ovens, the air supply inlet, and the spent gas outlet, all of said connections being so disposed that travel of spent gases through the regenerators from the oven heating walls to the spent gas outlet is across the direction of travel of air through the regenerators from the air supply inlet to the oven burners, and valves in the various connections for securing a travel of the spent gases through each regenerator in a given direction, or for securing a travel of air through each regenerator in a direction across the said direction.

16. The combination with a coke oven, an air supply inlet, and a spent gas outlet, of a pair of regenerators, connections leading to four contiguous faces of each regenerator, one of said connections leading to the heating walls of the oven, another of said connections leading to the spent gas outlet, another of said connections leading to the air supply inlet, and another of said connections leading to the oven burners, and valves or dampers in all of said connections.

ARTHUR ROBERTS.

Witnesses:
Thomas A. Banning, Jr.,
Wm. P. Bond.